United States Patent Office 3,520,825
Patented July 21, 1970

3,520,825
COMPOSITIONS CONTAINING ORGANIC
PEROXIDES
Michael Koehler, Munich, and Gottfried Brossmann,
Hollriegelskreuth, near Munich, Germany, assignors
to Elektrochemische Werke Munchen Aktiengesellschaft, Hollriegelskreuth, near Munich, Germany
No Drawing. Filed Dec. 12, 1966, Ser. No. 600,753
Claims priority, application Germany, Dec. 15, 1965,
E 30,667
Int. Cl. C08g *35/00;* C08f *15/16*
U.S. Cl. 252—426                                    5 Claims

ABSTRACT OF THE DISCLOSURE

An organic peroxide-containing paste composition containing a solid organic peroxide, water and a polyethylene glycol which melts at a temperature below the decomposition temperature of the peroxide and which, in admixture with the water and peroxide, melts at below room temperature.

---

This invention relates to organic peroxide containing compositions and, particularly, to such compositions in paste form.

For certain uses, for example certain surface treatments, peroxy compounds in aqueous paste form may be advantageous. Certain solid organic peroxides are highly reactive and are commonly used in the presence of inert materials. The present invention particularly relates to aqueous organic peroxide paste compositions also containing such inert materials. Some inert materials commonly used as desensitizers for organic peroxides are hydrophobic. The present invention further particularly relates to aqueous organic peroxide-containing paste compositions also containing such hydrophobic desensitizers. The peroxide pastes can be used to cure polyesters and acrylic resin materials.

The present invention provides organic peroxide-containing paste compositions comprising a solid organic peroxide, for instance in from 20% to 65%, preferably 40% to 65%, by weight of the composition, water, in for instance between 2% and 35% by weight of the peroxide, and a polyethylene oxide material which melts at a temperature below that at which the peroxide decomposes and which, in admixture with the water and peroxide present, melts at a temperature below room temperature, for instance below 15° C.

By polyethylene oxide material herein we mean one or more polyethylene oxide compounds by themselves or admixed with, if desired, a proportion of one or more organic compounds which are soluble therein and do not react with the components of the composition.

Advantageously the water introduced into the composition by admixture with the polyethylene oxide material is present in the peroxide as a consequence of its manufacture and/or is preferably present in from 15% to 30% by weight of the peroxide. Compositions according to the invention may contain e.g. cyclohexanone peroxide, p-chlorobenzoyl peroxide or 2,4 dichlorobenzoyl peroxide or, preferably benzoyl peroxide.

The peroxide is incorporated in compositions according to the invention in any desired manner, suitably by means of a planetary mixer or other suitable mixing or kneading device. It may be advantageous to grind the peroxide before incorporation into the composition so as to avoid milling the finished paste. Such grinding may be of the aqueous cream of crude peroxide before it is filtered.

Preferably, the polyethylene oxide compound or compounds used in compositions according to this invention is or are one or more polyethylene glycols. It may be advantageous to use a mixture of polyethylene oxide compounds in our invention. The melting point of polyethylene oxides tends to vary according to their molecular weight; low molecular weight materials being liquid at normal room temperature and higher molecular weight polyethylene oxides being hard wax-like substances at normal room temperatures. Mixtures of higher and lower molecular weight polyethylene oxides have melting points intermediate between those of the constituents of the mixtures. Since the peroxide must be incorporated into a liquid polyethylene oxide material, it is essential either that the polyethylene oxide be liquid at normal room temperature or be solid at such temperatures but have a melting point below the temperature at which the peroxide decomposes appreciably. To maintain a paste, the polyethylene oxide "in situ" in the paste must not be completely solid. The freezing point of polyethylene oxides is depressed by the presence of other constituents of the paste and it is essential, where the polyethylene oxide compound used has a sufficiently high molecular weight to be a solid at normal room temperatures that this depression is sufficient to lower its actual freezing point to below normal room temperatures. Where the paste comprises, merely, a polyethylene oxide compound, water and a solid organic peroxide the extent of this depression may be estimated by reference to data, for the particular type of polyethylene oxide compound concerned, which shows the variation of melting point of polyethylene oxides of various molecular weights in aqueous solution of varying concentrations, allowing for the effect of the presence of solid peroxide. Where the polyethylene oxide material in the paste comprises a polyethylene oxide compound together with an organic compound soluble therein the presence of the organic compound will usually have a considerable effect in the depression referred to. However, it is possible to determine by simple experiment in such a case whether the total effect of the other constituents on the polyethylene oxide is, or is not, sufficient to bring the composition within the scope of this invention. Preferably, pastes according to this invention contain more than 2% of water by weight. Paste compositions either with or without organic compounds soluble with polyethylene oxide compounds are provided by this invention. Advantageously, the polyethylene oxide material used in our invention contains a mixture of polyethylene oxide compounds, preferably of a normally liquid polyethylene oxide and a normally solid polyethylene oxide. Preferably, the polyethylene oxide compounds have an average molecular weight of from 1000 to 2000.

It is a particularly surprising aspect of the present invention and a particularly useful one, that hydrophobic desensitizers for the peroxide used may be incorporated in the compositions provided herein and exert their desensitizing effect on the peroxide, without affecting the homogeneity of the resulting paste. In the absence of polyethylene oxides as used in the invention, the hydrophobic desensitizers are incompatible in an organic peroxide containing aqueous paste where the water content of the peroxide is about 2% by weight. The hydrophobic desensitizers are introduced into the paste, essentially, in the polyethylene oxide material and it follows from this that only desensitizers which dissolve in the polyethylene oxide may be used. Suitable desensitizers according to this invention are phthalic acid esters, for example dimethyl phthalate or dibutyl phthalate. Advantageously, desensitizers are used in a quantity equivalent to from 5% to 20% by weight of the paste preferably 7.5% to 15% by weight of the paste.

Advantageously, the paste may also contain dispersing or emulsifying agents for instance alkyl phenyl polyglycol ethers suitably in from 0.5% to 5.0% by weight of the paste. Pastes according to our invention are particularly useful for curing unsaturated polyester or acrylic resins.

The invention will now be particularly illustrated by the following examples:

EXAMPLE 1

A polyethylene oxide material having a melting point of 45° C. and consisting of a mixture of 700 g. of a polyethylene glycol having an average molecular weight of 3000, and 700 g. of a polyethylene glycol having a molecular weight of 600, was melted and placed in a small kneader and cooled to slightly above the solidification temperature. Then, while stirring was continued, 2680 g. of 76% benzoyl peroxide (24% water) was added in portions and, when the addition was completed, was kneaded for a further hour. The polyethylene glycol mixture, in admixture with the amount of water and peroxide used, melts at below room temperature, and a soft and plastic paste, containing approximately 50% of benzoyl peroxide, was obtained. If required, the paste can be further triturated in a roll mill.

EXAMPLE 2

A polyethylene oxide material having a melting point below the decomposition temperature of benzoyl peroxide and consisting of a mixture of 600 g. of a polyethylene glycol having a molecular weight of 600, 600 g. of a polyethylene glycol having a molecular weight of 3000 and 360 g. of dibutyl phthalate was melted and placed in a small kneader, and cooled to slightly above the solidification temperature. Then, while stirring was continued, 2440 g. of previously ground 82% benzoyl peroxide (18% water) was incorporated into the mixture in portions and kneaded for a further hour. The polyethylene oxide material in admixture with the amount of water, peroxide and dibutyl phthalate present, melts at below room temperature and a very plastic and stable paste, containing approximately 50% of benzoyl peroxide, was obtained.

The term "room temperature" used herein is to be understood to designate the temperature range of about 15 to 25° C.

We claim:

1. An organic peroxide-containing paste composition consisting essentially of from 20% to 65% by weight of a solid organic peroxide selected from the group consisting of cyclohexanone peroxide, p-chlorobenzoyl peroxide, 2,4-dichlorobenzoyl peroxide, and benzoyl peroxide, water in an amount of from 2% to 35% by weight of peroxide, and a polyethylene glycol having an average molecular weight of at least about 1000 and which melts at a temperature below that at which the peroxide decomposes and which, in admixture with the water and peroxide present, melts at below room temperature.

2. A composition as claimed in claim 1 wherein the polyethylene glycol is a mixture of polyethylene glycols having an average molecular weight of from 1000 to 2000.

3. A composition as claimed in claim 1 wherein the polyethylene glycol is a mixture of a normally liquid polyethylene glycol and a normally solid polyethylene glycol.

4. A composition as claimed in claim 1 wherein the polyethylene glycol has contained therein from 5% to 20% by weight of the composition of a lower alkyl phthalate ester as a hydrophobic organic peroxide desensitizer.

5. A composition as claimed in claim 1 wherein the polyethylene glycol has contained therein from 0.5% to 5.0% by weight of the composition of an alkyl phenyl polyglycol ether as an emulsifying agent.

References Cited

UNITED STATES PATENTS

| 2,858,280 | 10/1958 | Maltha | 252—426 |
| 2,910,443 | 10/1959 | Bader | 252—426 XR |
| 3,290,257 | 12/1966 | Bader et al. | 252—426 |
| 3,377,407 | 4/1968 | Kressin et al. | 252—426 XR |

PATRICK P. GARVIN, Primary Examiner

U.S. Cl. X.R.

260—78.4, 86.1